(12) United States Patent
Jeong (10) Patent No.: US 11,135,547 B1
(45) Date of Patent: Oct. 5, 2021

(54) AIR COOLED CONDENSING HEAT EXCHANGER SYSTEM WITH ACID CONDENSATE NEUTRALIZER

(71) Applicant: Arkansas State University—Jonesboro, State University, AR (US)

(72) Inventor: Kwangkook Jeong, Jonesboro, AR (US)

(73) Assignee: Arkansas State University—Jonesboro, State University, AR (US)

( * ) Notice: Subject to any disclaimer, the term of this patent is extended or adjusted under 35 U.S.C. 154(b) by 223 days.

(21) Appl. No.: 15/721,835

(22) Filed: Sep. 30, 2017

Related U.S. Application Data (63) Continuation-in-part of application No. 62/402,239, filed on Sep. 30, 2016, and a continuation-in-part of application No. 14/076,013, filed on Nov. 8, 2013, now Pat. No. 10,010,810, which is a continuation-in-part of application No. 61/724,898, filed on Nov. 9, 2012.

(51) Int. Cl.
| | | |
|---|---|---|
| B01D 53/00 | (2006.01) | |
| B01D 53/26 | (2006.01) | |
| F28B 1/06 | (2006.01) | |
| B01D 5/00 | (2006.01) | |
| C10K 1/00 | (2006.01) | |
| F28D 21/00 | (2006.01) | |

(52) U.S. Cl.
CPC ........... *B01D 53/265* (2013.01); *B01D 5/006* (2013.01); *B01D 5/009* (2013.01); *B01D 5/0012* (2013.01); *B01D 5/0072* (2013.01); *C10K 1/004* (2013.01); *F28B 1/06* (2013.01); *F28D 2021/0038* (2013.01)

(58) Field of Classification Search
CPC .... B01D 53/265; B01D 5/0012; B01D 5/006; B01D 5/0072; B01D 5/009; B01D 5/0084; B01D 5/0087; B01D 5/0075; C10K 1/004; F28B 1/06; F28B 2021/0038; F24H 8/006; F23J 2900/01002; F23J 2900/01004; F23J 2900/13004
See application file for complete search history.

(56) References Cited

U.S. PATENT DOCUMENTS

| | | | | |
|---|---|---|---|---|
| 1,717,334 | A * | 6/1929 | De Florez | C10G 9/20 122/236 |
| 3,294,162 | A * | 12/1966 | Loehlein | B21D 53/06 165/181 |
| 3,368,615 | A * | 2/1968 | Brown | F25B 39/02 165/149 |
| 3,483,920 | A * | 12/1969 | Kletch, Jr. | F28D 7/085 165/165 |
| 3,751,231 | A * | 8/1973 | Niedzielski | B01D 46/30 55/318 |

(Continued)

*Primary Examiner* — Travis C Ruby
(74) *Attorney, Agent, or Firm* — Schrantz Law Firm, PLLC; Stephen D. Schrantz (57) ABSTRACT

An air-cooled condensing heat exchanger system ("ACHX") installed in a fossil power plant flue gas treatment system recovers water and low temperature waste heat from boiler flue gas for advanced coal fired power plant applications. More particularly, the ACHX system recovers water from combustion flue gas by phase change. To recover water from flue gas, the ACHX system uses ambient air from an air intake installed on the stack to cool down the flue gas in the ACHX.

20 Claims, 6 Drawing Sheets

(56) References Cited

U.S. PATENT DOCUMENTS

| | | | | |
|---|---|---|---|---|
| 3,882,019 | A * | 5/1975 | Burke | C02F 9/00 210/711 |
| 3,951,198 | A * | 4/1976 | Ross | B01D 5/0009 165/65 |
| 4,227,647 | A * | 10/1980 | Eriksson | F24H 4/02 237/2 B |
| 4,289,730 | A * | 9/1981 | Tomlinson | B01D 53/34 110/203 |
| 4,309,947 | A * | 1/1982 | Ketterer | F24H 8/006 110/203 |
| 4,403,572 | A * | 9/1983 | Gerstmann | F24D 11/002 122/20 B |
| 4,444,156 | A * | 4/1984 | Iwasaki | F24H 1/145 110/203 |
| 4,475,587 | A * | 10/1984 | Vasiliev | F28D 7/0058 165/140 |
| 4,543,892 | A * | 10/1985 | Tomlinson | B01D 53/507 110/203 |
| 4,631,915 | A * | 12/1986 | Frewer | C07C 29/1518 518/703 |
| 4,653,466 | A * | 3/1987 | DeHaan | F24H 8/006 126/110 R |
| 4,729,328 | A * | 3/1988 | Shellenberger | B01D 45/00 110/186 |
| 4,757,770 | A * | 7/1988 | Lisowyj | B01D 7/02 110/216 |
| 4,848,314 | A * | 7/1989 | Bentley | F28F 19/04 126/116 R |
| RE33,082 | E * | 10/1989 | Gerstmann | F24D 11/004 122/20 B |
| 4,926,931 | A * | 5/1990 | Larinoff | F28B 1/06 165/111 |
| 5,050,541 | A * | 9/1991 | Kobayashi | F22B 1/1869 122/235.11 |
| 5,375,586 | A * | 12/1994 | Schumacher | F24H 8/006 126/110 R |
| 5,476,088 | A * | 12/1995 | Hamos | F24H 8/006 126/110 R |
| 5,536,488 | A * | 7/1996 | Mansour | B01B 1/005 423/652 |
| 5,634,950 | A * | 6/1997 | McIlroy | C10J 3/54 48/111 |
| 5,645,616 | A * | 7/1997 | McIlroy | C10J 3/54 48/202 |
| 5,857,324 | A * | 1/1999 | Scappatura | B01D 53/922 60/274 |
| 6,196,303 | B1 * | 3/2001 | Hepper | F24F 1/0007 165/111 |
| 6,820,685 | B1 * | 11/2004 | Carter | F28B 1/06 165/150 |
| 8,056,553 | B2 * | 11/2011 | Khan | F24H 3/087 126/116 R |
| 8,191,512 | B2 * | 6/2012 | Park | F23J 15/06 122/18.1 |
| 2006/0194159 | A1 * | 8/2006 | Franz | F23J 15/04 431/11 |
| 2009/0050077 | A1 * | 2/2009 | Kim | F24D 12/02 122/15.1 |
| 2009/0272340 | A1 * | 11/2009 | Farrell | F23J 13/025 122/166.1 |
| 2010/0170425 | A1 * | 7/2010 | Magaldi | F23J 1/02 110/165 R |
| 2010/0176064 | A1 * | 7/2010 | Batty | B01D 5/0012 210/737 |
| 2010/0294457 | A1 * | 11/2010 | Magaldi | F23J 1/02 165/47 |
| 2011/0297061 | A1 * | 12/2011 | Magaldi | F23J 1/02 110/344 |
| 2012/0186791 | A1 * | 7/2012 | Ciora, Jr. | F28F 1/405 165/109.1 |
| 2012/0240869 | A1 * | 9/2012 | Walters | F24H 1/43 122/14.2 |

* cited by examiner

AIR COOLED CONDENSING HEAT EXCHANGER SYSTEM WITH ACID CONDENSATE NEUTRALIZER

CROSS-REFERENCE TO RELATED APPLICATIONS

This application claims priority to and is a continuation in part of U.S. Application Ser. No. 62/402,239 filed on Sep. 30, 2016 entitled Air Cooled Condensing Heat Exchanger System. This application also claims priority to and is a continuation in part of U.S. application Ser. No. 14/076,013 filed on Nov. 8, 2013 entitled Condensing Heat Exchanger System which is a continuation in part of U.S. Application Ser. No. 61/724,898 filed on Nov. 9, 2012 entitled Integrated Reaction Condensing Heat Exchanger System.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

Field of the Invention

The present invention relates to an air cooled condensing heat exchanger system ("ACHX"). In one embodiment, the condensing heat exchanger system may be installed in existing or advanced fossil power plant applications. More particularly, the present invention relates to an ACHX that decreases water consumption, increases energy efficiency, and lowers capital costs associated with fossil power plants.

Background of the Invention

Water supply issues are increasing in importance for new and existing power plants because the freshwater supply is limited. For companies considering the development of new thermoelectric power plants, water is a first-order concern. The impacts of water supply depend on the economics of water availability in the region in which the power plant is to be built. As demand for electricity and water increases, many thermoelectric power plants will find it difficult to obtain the large quantities of water needed to maintain operations. Most of the water used in a thermoelectric power plant is used for cooling. There is a need for reducing the amount of fresh water used by power plants because thermoelectric power plants utilize significant quantities of water.

Power plant exhaust gases release large amounts of water vapor into the atmosphere. The water vapors contained in flue gas will be a potential source for obtaining much needed cooling water for a power plant. There is almost 40% moisture (by wet coal mass basis) in lignite coal, which translates to 16% moisture by volume (wet basis) in the flue gas. For example, a 600 MW power plant firing lignite exhausts a flue gas flow rate of $2.7 \times 10^6$ kg/h, which includes a moisture flow rate of $0.43 \times 10^6$ kg/h, or about 16 wt. % of the flue gas. In contrast, typical cooling tower evaporation rates for a 600 MW power plant unit are $0.7 \times 10^6$ kg/h which is to be made up by fresh water.

If a power plant could recover and reuse a portion of this moisture, it could reduce its total cooling water make-up requirement. The most practical way to recover water from flue gas is to use an air-cooled condensing heat exchanger (ACHX). The power plant could also recover latent heat due to condensation, and sensible heat due to lowering the flue gas exit temperature. Harmful acid gases such as $H_2SO_4$, HCl, and $HNO_3$ can also be condensed by the heat exchanger to prevent these acid gases from entering the atmosphere. Ambient air will be used as coolant for the ACHX after which the heated air will be routed into the air pre-heater for boiler primary air inlet.

SUMMARY OF THE INVENTION

The air-cooled condensing heat exchanger recovers water and low temperature waste heat from boiler flue gas in coal-fired power plants. Power plants find it increasingly difficult to obtain the large quantities of water needed to maintain operations. However, the current existing thermoelectric power plants have no tool to recover water. The heat exchanger system of the present invention saves fresh water consumption a minimum of 0.5% P and coal consumption a minimum of 1.6% P which will enhance the overall plant efficiency by up to 0.5% P.

The heat exchanger of the present invention addresses water issues in power plant industry. According to the 2010 USGS report, thermoelectric power plants used 161,000 million gallons of water per day for cooling and other processes, which was the largest portion as 45.4% of total water use in the United States. Currently, securing water resource is the first concern for power companies building and operating the power plants. The heat exchanger system of the present invention reduces fresh water consumption by recovering water from available resources within the plants.

The heat exchanger of the present invention reduces water consumption and withdrawal of coal-firing power plants by recovering water moisture from their exhaust flue gas. The heat exchanger of the present invention also recovers waste heat from stack because the heat exchanger cools down the stack gas by using ambient air. For example, a 600 MW coal-fired power plant typically withdraws 6.5 million gallons of water per day due to evaporation and drift. The plant exhausts about 6 million lb/hr of flue gas containing 0.66 million lb/hr of water moisture. If 50% of the moisture is captured by using the novel design air-cooled condensing heat exchanger (ACHX), the plant will save 1 million gallons of water per day which is equivalent to saving 0.5% P of annual fresh water consumption. The ACHX will also recover waste heat because ambient air is used as its coolant, and the heated ambient air will be routed into air preheater to reduce the boiler load, which will save 37,686 ton of sub-bituminous coal consumption per year in the plant, enhancing the plant efficiency by 0.5% P. It will be equivalent to saving 1.6% of domestic coal consumption for power generation. Additional benefits will include 1) further reduction of multi-acids due to its condensation and removal processes, and 2) reduced visibility of wet plumes exhausted by stack due to reduced moisture concentration in flue gas.

Currently, there is no specific equipment to recover water and low temperature waste heat at stack in domestic coal-fired power plants. However, two water capture technologies including the water-cooled condensing heat exchanger (WCHX) and membrane technologies have been competing. The WCHX has been demonstrated to perform higher capture efficiency and better scalability but still requires water as coolant. The water recovery system may be undesirable to use water as coolant, because 1.5-3 times larger amount of water than flue gas flow rate is required to reach 50~70% of water capture efficiency. The temperature of available water around power plants is high, which limits the water capture efficiency due to higher interfacial temperature.

The air cooled heat exchange system of the present invention provides a unique approach. The proposed system cools down the flue gas by using relatively colder ambient air taken from a high-riser to be embedded near the stack top (at elevated height up to 500 to 1,200 feet), where the air temperature drops down about 1.8 to 3° C. than ground level. Acids dissolved in the water condensates will be removed as passing through novel porous tube type adsorption and catalytic filters equipped at the drainage bottom of ACHX. The ACHX will send the purified water condensate to the make-up water tank while the heated air is routed to the air preheater for boiler primary air inlet. Water-energy related projects for power plant applications are directed towards water recovery and saving. The air cooled heat exchange system of the present invention associated with the water recovery provides three goals, including 1) to recover 950,000 gallons of water per day per 600 MW plant, 2) to achieve 28 MW of low-temperature heat recovery rate per 600 MW plant by using ACHX, and 3) to additionally remove acids in flue gas e.g. sulfuric acids from 20 ppm to 2 ppm.

Figure 5:
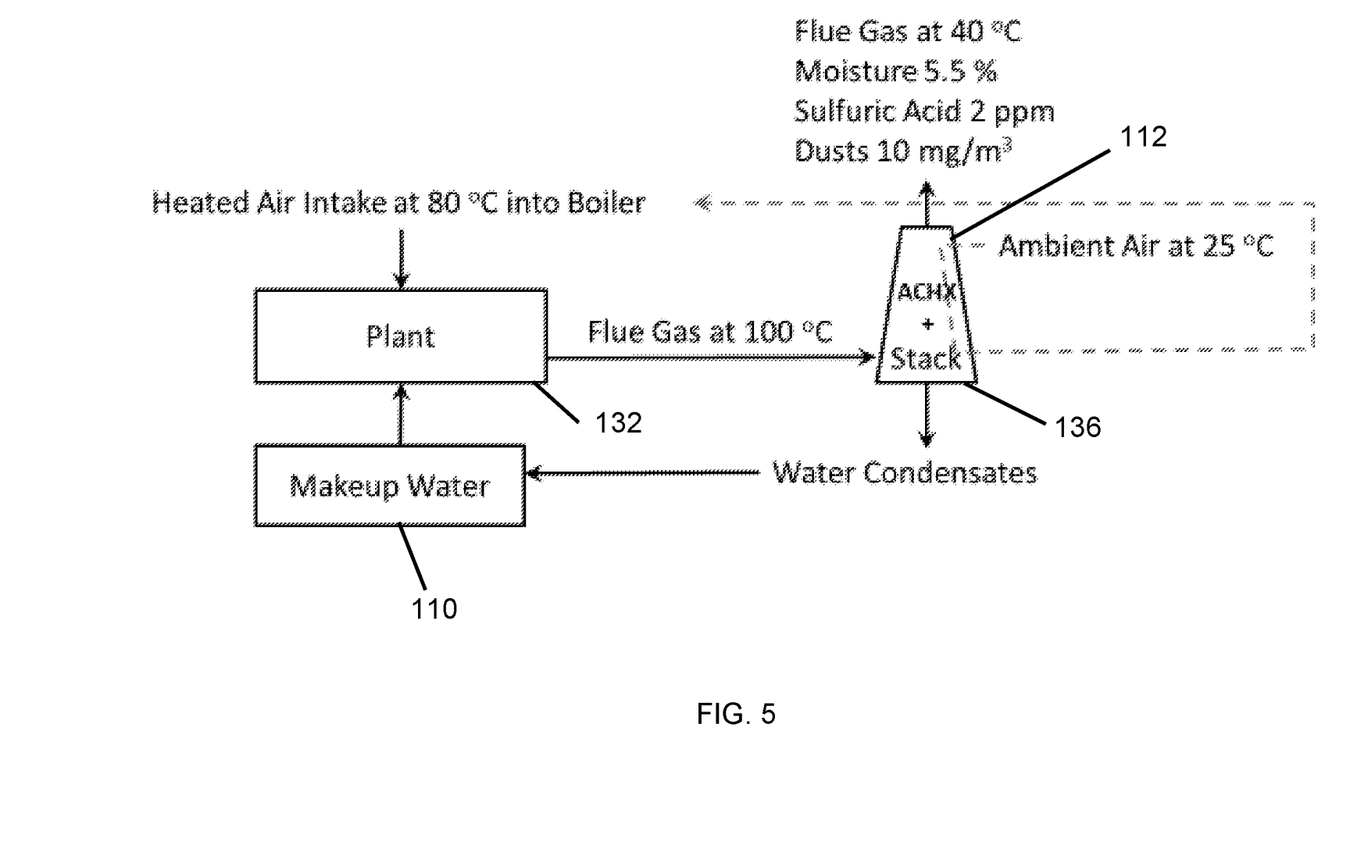
FIG. 5 is an environmental view of a power plant system with combined air-cooled condensing heat exchanger system of the present invention and stack facility.

The unique aspects of the air cooled heat exchanger system, distinguishing the present invention from the ARPA-E ARID program are 1) to recover water from boiler flue gas to reuse in cooling tower or any make-up water by using novel design ACHX, 2) to recover low-temperature waste heat to reduce boiler loads by using novel design ACHX, and 3) to remove acids by using novel design porous media acid and particulates removal system. Additionally, as depicted in FIG. 5, one embodiment of the air cooled heat exchange system, combines the ACHX function with stack facility.

Some countries have installed GGH (Gas to Gas Heater) before stack to heat up the moisture in stack gas into superheated vapors since public was concerned about plum-induced fogging or icing from power plants. The heat exchanger of the present invention resolves the issue by reducing the moisture concentration before reaching the stack.

In one embodiment of the present invention, the condensing heat exchanger system ("ACHX") recovers water from combustion flue gas in fossil power plants. The ACHX generally comprises a high efficiency condensing heat exchanger ("CHX"), and an acid removal system ("ARS"). In another embodiment, the invention is an air cooled condensing heat exchanger system for integration into a fossil power plant, the ACHX system provides at least one condensing heat exchanger (CHX) with a duct (or housing) providing a base, an external duct surface having a plurality of inlets and outlets along each side of the duct, a cross-flow type heat exchanger with counter flow fluid side selection to route flue gas and air from opposite sides, at least one horizontal tube bank, and at least one vertical tube bank, with each of the tube banks providing a plurality of tubes/conduits and each tube having at least one finned tube section extending from the openings on the external duct surface. Each tube may further include a plurality of u-shaped bends upon which one or more fins are exposed through the duct. Each CHX may further provide a porous-type reaction bed connected near the base 98 of the condensing heat exchanger.

In yet another embodiment, the ACHX may further provide:
A. simultaneously separating water vapors and acid vapors from combustion flue gas exhausted from a boiler or a gas turbine system;
B. removing acid from the water-acid condensate by neutralizing any dissolved acids in the (condensed) coolant water; and
C. regenerating a reaction bed by using high temperature desorption process.

The ACHX system has higher condensation efficiency than a typical condensing heat exchanger because the present ACHX (1) applies an innovative novel tube configuration for increasing the probability density of colliding water vapors into the tube surfaces, (2) lowers interfacial temperature with combination of air-cooled effects, and (3) improves mass transfer coefficients with higher heat transfer coefficients in the shell and tube sides of the duct.

In an embodiment where the ACHX includes a packed-bed reaction system, this packed-bed reaction system is assembled under the base surface of the ACHX duct (or housing) and assists in liquid phase acid removal. The ACHX system also provides for 1) additional low temperature heat recovery after the economizer, 2) lower exhaust temperature of flue gas at the stack, 3) lower moisture contents in exhaust flue gas at the stack, and 4) reduced acid emission in flue gas at the stack.

The ACHX may be installed between flue gas treatment system and the stack. The ACHX may be immediately applied for use in existing fossil power plants, such as coal-, oil-, or natural gas-fired power plants, to save fresh water consumption and recover low temperature heat. The ACHX may also be utilized for any other type of power plant in need of water recovery from combustion flue gas, as well as those power plants in need of acid reduction and low temperature heat recovery. The ACHX may be used as backup equipment to separate acids in case of other acid scrubber system failures. This ACHX will also have significant technical impacts in power plant cooling technologies not only concerning saving fresh water consumption, but also concerning reducing flue gas exit temperature and reducing acid emission at stack. The ACHX heats the ambient air to recover waste heat from stack.

It is an object of the present invention to utilize an integrated reaction and condensing heat exchanger for condensing and recovering water vapor from a flue gas treatment system in power plants, wherein the invention may be integrated between the flue gas treatment system and the stack.

It is an object of the present invention to provide an air-cooled heat exchanger ("ACHX") that enables water capture efficiency as high as water-cooled heat exchanger ("WCHX").

It is an object of the present invention to provide an acid removal system that operates at low cost.

It is another object of the present invention to provide analytical modeling that accurately simulates heat and mass transfer between air and flue gas side in ACHX.

It is another object of the present invention to supply the ACHX with air from inlet at an air intake from high riser and combining ACHX and stack.

It is another object of the present invention to provide advanced cross-flow heat exchangers with novel design tube arrangements.

It is another object of the present invention to provide an acid removal system using porous medium adsorption tubes.

It is another object of the present invention to reduce the current payback period and unit building cost of power plants.

It is an object of the present invention to deliver high condensation efficiency by increasing the effective heat transfer area for the colliding water vapors into the bare tube surfaces by reducing residence time of condensate film covering tube surface with an innovative novel tube configuration having a plurality of horizontal and vertical tube banks.

It is another object of the present invention to deliver high condensation efficiency by lowering interfacial temperature from exposed portion of finned tubes on outer duct surface due to external natural convection.

Other objects, features, and advantages of the invention will be apparent from the following detailed description taken in connection with the accompanying drawings.

In addition to the features and advantages of the condensing heat exchanger according to the present invention, further advantages thereof will be apparent from the following description in conjunction with the appended drawings.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

DETAILED DESCRIPTION OF THE INVENTION

Water Recovery in Power Plants

Figure 1:
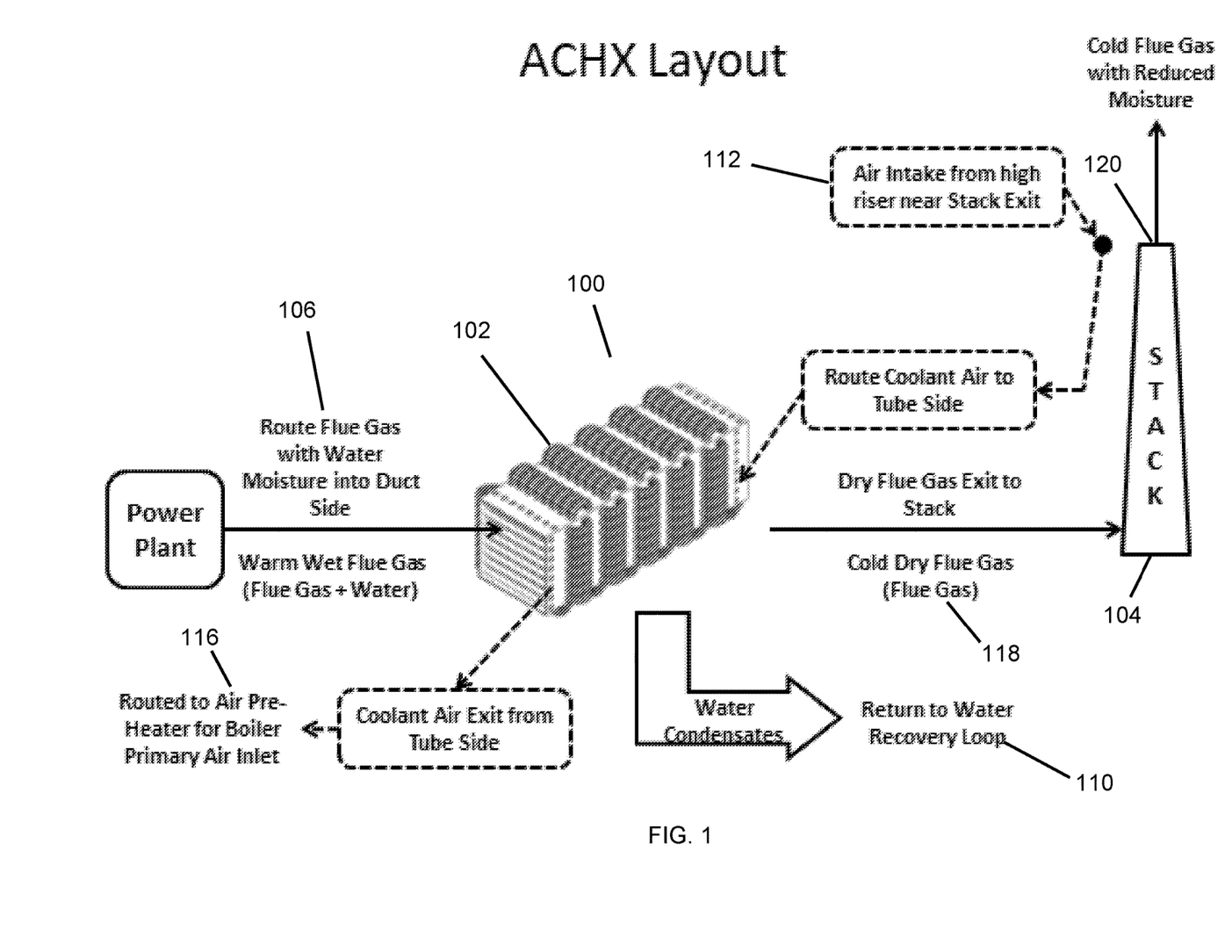
FIG. 1 is an environmental view of one embodiment of an air cooled condensing heat exchanger system of the present invention.

Water recovery in power plants separates and regenerates water vapors involved in boiler flue gas into liquid water to save fresh water consumption. FIG. 1 shows an environmental view of the air cooled condensing heat exchanger system 100. The system 100 provides an air cooled condensing heat exchanger 102 installed between the boiler and the stack 104. Flue gas 106 exhausted from boiler or gas turbine can be a potential source for obtaining the water needed for a power plant since flue gas 106 contains a large amount of water vapor in 6-16 vol %. The flue gas 106 may be exhausted from a boiler or from a combustor. Moisture can be phase-changed into liquid water and separated from flue gas by using condensation technology.

In one embodiment, the present invention is an integrated condensing heat exchanger system 100 comprising a condensing heat exchanger (CHX) 102, such as an air cooled condensing heat exchanger (ACHX), an acid removal system (ARS) 108, and water recovery 110 as shown in FIG. 1. The ACHX system 100 may be installed at post flue gas treatment system in the power plant. Flue gas 106 ranging from 90-100° C. flows into the shell and tube side of the ACHX 102 at entrance 130 shown in FIG. 2. The boiler exit temperature is set to an industry standard, and averages 100° C.

As depicted in FIG. 1, as the ACHX 102 cools down flue gas 106, water and minor acid vapors are simultaneously separated from the flue gas 106 in the ACHX 102. Film condensation of water vapors occurs on each of the tube surfaces as the tubes surface temperature cools down below the dew point of water vapor in flue gas 106. The condensed water is then separated by density difference and is collected at the bottom of ACHX 102. After filtration, acid removal, and/or demineralization, the water is then recycled into appropriate water supplies including without limitation feed water, make-up water for cooling tower, or for use in any other application.

The acid removal system (ARS) 108 alkalizes the acidic water condensates assembled under the ACHX 102. ARS removes 90% of incoming acids into the ACHX 102 as liquid phase dissolved in water condensates by using reaction technology, such as neutralization reaction, catalytic reaction, adsorption reaction, or any other comparable reaction technology. After demineralization, recovered water will be utilized for make-up water or other use in power plants.

Air intake 112 accepts air from a higher elevation located above the ground level at stack 104. This cooler air from intake 112 flows to tube side of the ACHX 102 and through the ACHX 102 towards the boiler primary air inlet 116. The cooler air from intake 112 cools the flue gas 106 flowing through the ACHX 102 from the boiler.

The ACHX 102 heats the air from air intake 112. Air from intake 112 cools flue gas 106. Flue gas 106 heats the air from intake 112 to preheat the air for the boiler primary air inlet 116. The temperature of the flue gas 106 decreases by approximately 60° C. after leaving the ACHX 102. The flue gas then exits the stack 104 at exit 120.

Figure 2:
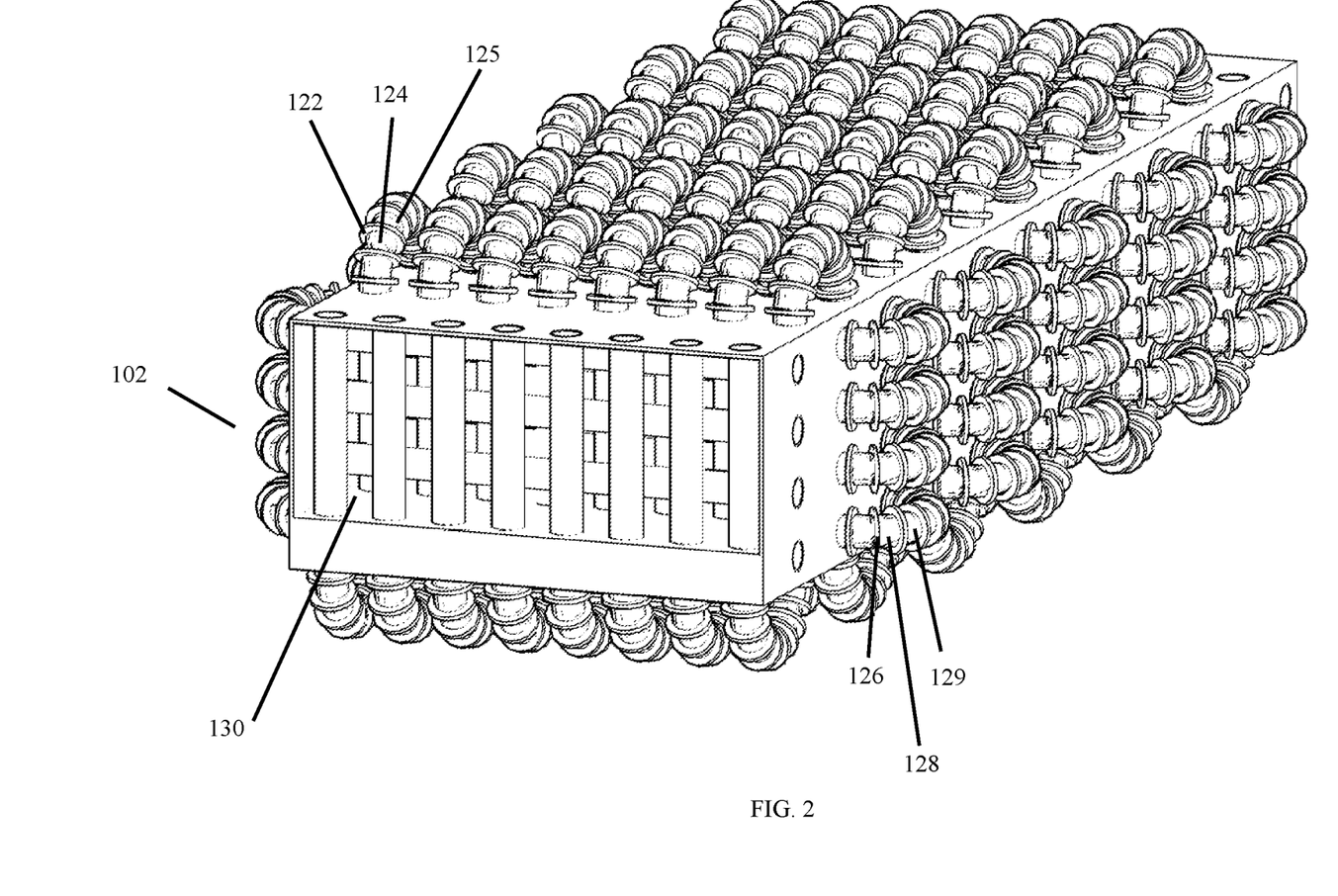
FIG. 2 is a perspective view of a condensing heat exchanger of one embodiment of the present invention.

To lower the coolant temperature, the ACHX 102 is used in connection with an air-cooled condenser by exposing a plurality of u-shaped tube sections 124, 128 with fins 122, 126 out of plane to the duct surface, to immediately take cooling effects with natural convection as shown in FIG. 2.

Condensate liquid film made by water condensation tends to behave as a resistance to convective heat and mass transfer because the film temperature is slightly higher than the actual tube surface temperature. The liquid film on the tube surface 122, 124, 126, 128 should be removed as quickly as possible to secure more effective heat transfer areas in the ACHX 102 so that the probability density of the colliding water vapors directly into the effective tube surface is maximized. Roughness of materials are taken into account in tube selections since surface tension between liquid film and tube surface should be reduced to increase tube surface area uncovered with liquid film.

Within the duct, disadvantages of typical heat exchangers, having either a vertical or a horizontal tube configuration, may be overcome by applying the combined horizontal 128 and vertical tube 124 arrangements of heat exchanger conduits of the present CHX 102. The configuration of the present tube configuration enhances the effective tube surface areas and heat/mass transfer coefficients. The tube side of the present tube configuration increases convective heat transfer coefficients by applying a plurality of u-bend tube sections 125, 129, due to continued thermal/momentum entry region right following every bend of each tube 124, 128.

The heat exchanger 102 of the present invention provides a novel design air-cooled heat exchanger ("ACHX") that achieves higher water capture efficiency, 2) recovers water and low temperature heat to enhance the plant efficiency and operational cost, 3) provides a novel design for acid removal systems, and 4) combines WCHX into existing stack facility. A program associated with the ACHX system estimates the performance parameters including water capture efficiency, plant efficiency, and operational cost, etc. by using analytical modeling on a baseline full-scale plant. The program assists the user with implementing the proper design and sizing of the ACHX and system for the specific power plant.

The heat exchanger system 100 cools down the flue gas 106 by using relatively colder ambient air taken from a high-riser at cooling air intake 112 to be embedded to the stack top 104 (at elevated height up to 1,000 feet), where the air temperature drops down approximately 1.8 to 3° C. below the temperature at ground level.

The heat exchanger system 100 removes acids from the water condensates. The heat exchanger system 100 directs the water condensates towards adsorption filters 138 at ARS 108 shown in FIGS. 1 and 6. Acids dissolved in the water condensates will be removed as passing through novel porous tube type adsorption filters 138 at porous drain tubes 139 equipped at ARS 108 located at the drainage bottom of ACHX 102. The ACHX 102 sends the purified water condensate to the make-up water tank 110 while the heated air 116 is routed to the air preheater for boiler primary air inlet.

Figure 3:
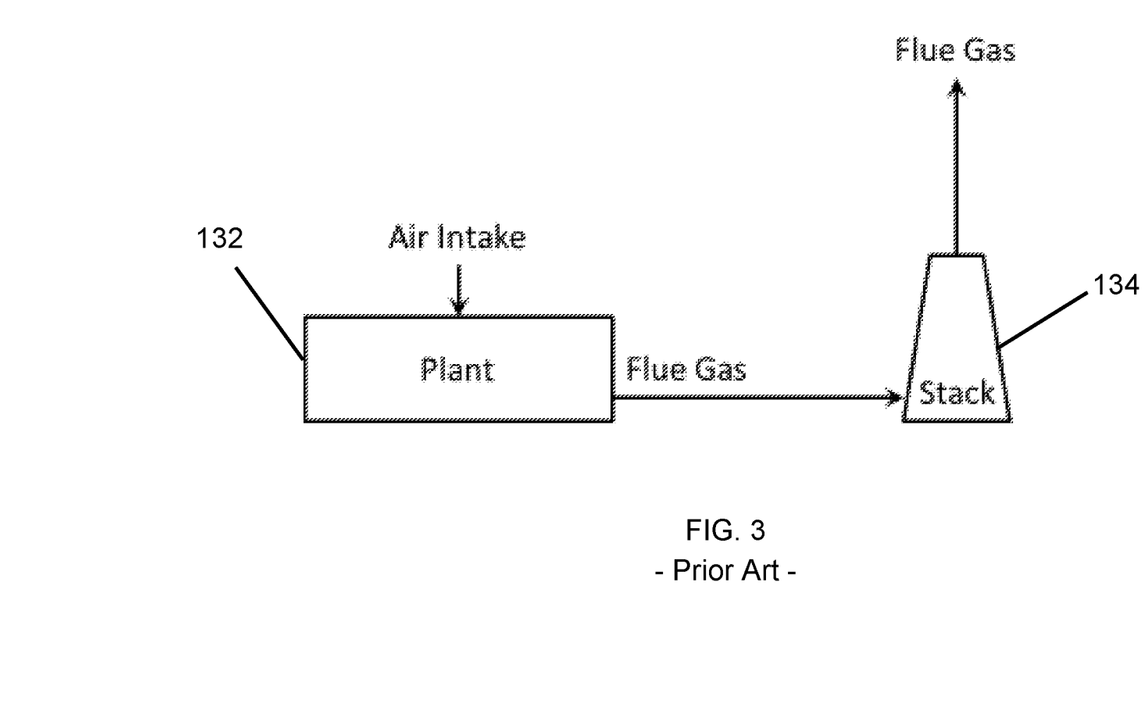
FIG. 3 is an environmental view of an existing power plant system without ACHX.
Figure 4:
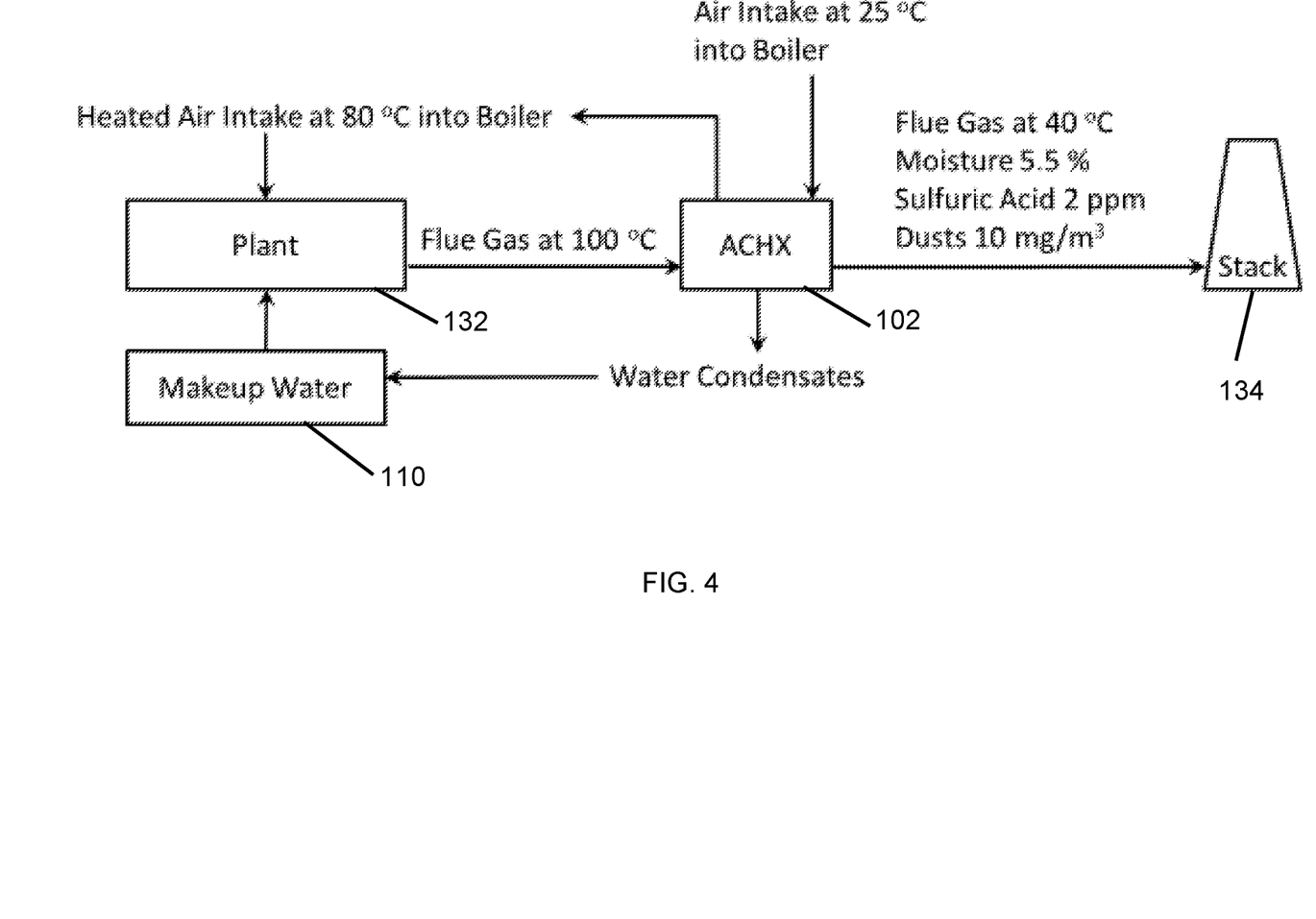
FIG. 4 is an environmental view of a power plant system with air cooled condensing heat exchanger system of the present invention.

FIGS. 3-5 show the a) current conditions of flue gas and air intake (FIG. 3), b) independent installation of ACHX (FIG. 4) and c) combined ACHX and stack by using spiral-tube-embedded wall (FIG. 5).

FIG. 3 shows the current flue gas exit condition from stack 134 at a conventional coal-fired power plant 132.

FIG. 4 shows one option of independent installation of ACHX 102 at a conventional coal-fired power plant 132 with stack 134.

FIG. 5 shows another option of a combined ACHX and stack 136 at a conventional coal-fired power plant 132 by using spiral-tube-embedded wall. The ACHX systems 100 reduce the current payback period and unit building cost of power plant with this integration.

The heat exchanger system 100 of the present invention recovers water and low temperature waste heat for thermoelectric power plants. The heat exchanger system 132 can be applied for several types of advanced power plants including USC (Ultra-supercritical), A-USC (Advanced Ultra-supercritical), and USC-CFB (Ultra-supercritical Circulating Fluidized Bed), etc.

The ACHX 102 provides water capture efficiency as high as WCHX. The acid removal system 108 of the present invention operates at low cost. The ACHX 102 also provides an air intake 112 from high riser and combining ACHX and stack 136.

Figure 6:
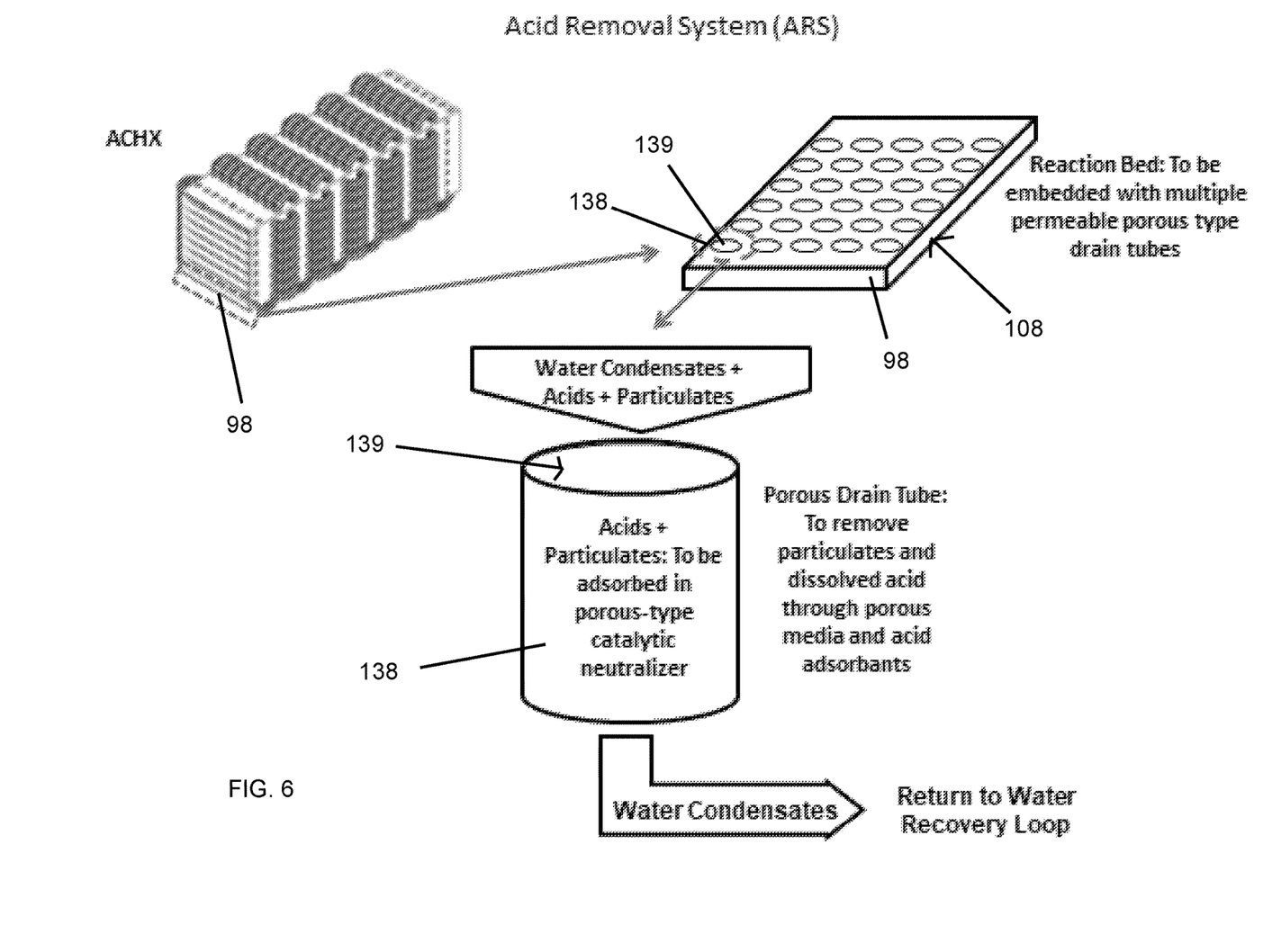
FIG. 6 is an environmental view of an acid removal system installed on a condensing heat exchanger of one embodiment of the present invention.

The ACHX 102 provides advanced cross-flow heat exchangers with novel design tube arrangements and acid removal system 108 using porous medium adsorption tube filters 138.

The ACHX system 100 recovers water and low temperature waste heat from boiler flue gas in coal-fired power plants. The ACHX system 100 includes three sub-systems including novel design ACHX 102, acid removal system 108, and air-intake system 112.

The ACHX system 100 provides a minimum water capture efficiency at 50%. The ACHX system 100 also enhances overall plant efficiency minimum 0.5% P by using the low temperature heat recovery.

The present invention provides a computer program for modeling full-scale ACHX 102 and ACHX systems 100.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A condensing heat exchanger system for reducing water content of a flue gas, the system comprising:
    a housing of a heat exchanger for passage of the flue gas through the housing;
    a housing entrance of the housing wherein the flue gas flows into the housing entrance;
    a housing exit of the housing wherein the flue gas flows from the housing entrance towards the housing exit for passing through the housing;
    a base of the housing for collection of water condensed from the flue gas within the heat exchanger;
    a reaction bed located in the base wherein the water condensed from the flue gas flows through the reaction bed to remove at least a portion of an acid from the water;
    a water recovery loop connected to the reaction bed wherein the water flows through the reaction bed to the water recovery loop;
    at least one porous drain tube in the reaction bed, wherein the porous drain tube further comprises at least one acid adsorbant filter, wherein the water condensed from the flue gas flows through the porous drain tube of the reaction bed to the water recovery loop; and
    a make-up water tank wherein the water flows through the drain tube to the make-up water tank, wherein the make-up water tank is connected to the water recovery loop to be used as a water supply.

2. The system of claim 1 further comprising:
wherein the flue gas flows longitudinally from the housing entrance to the housing exit through the housing;
a horizontal conduit that extends horizontally in a direction non-planar to the flow of the flue gas;
a curved section of the horizontal conduit that directs the horizontal conduit in a direction planar to the flow of the flue gas;
a vertical conduit that extends vertically;
a curved section of the vertical conduit that directs the vertical conduit in a direction planar to the flow of the flue gas;
at least one fin extending outward from the curved section of the horizontal conduit;
at least one fin extending outward from the curved section of the vertical conduit;
an ambient air intake drawing ambient air into the vertical conduit and the horizontal conduit, wherein the ambient air flows inside of the vertical conduit and the horizontal conduit; and
the ambient air flowing through the vertical conduit and the horizontal conduit from the housing exit towards the housing entrance counter the flow of the flue gas, wherein the flue gas flows through the housing outside of the vertical conduit and the horizontal conduit, wherein the flue gas flows across an outer surface of the vertical conduit and an outer surface of the horizontal conduit, wherein the flue gas flows counter the flow of the ambient air flowing internally through the horizontal conduit and the vertical conduit.

3. The system of claim 2 further comprising:
a stack, wherein the ambient air intake is secured to said stack.

4. The system of claim 3 wherein the ambient air intake is located at least 500 feet above ground level.

5. The system of claim 1 wherein the acid adsorbant filter is located within the drain tube.

6. The system of claim 5 wherein the condensate water flows gravitationally downward through the porous drain tube through the acid adsorbant filter when flowing through the drain tube to the make-up water tank and the water recovery loop, wherein the acid adsorbant filter neutralizes the water as the water passes downward through the drain tube.

7. The system of claim 6 further comprising:
a second porous drain tube in the reaction bed;
an acid adsorbant filter located within the second drain tube;
wherein the water condensed from the flue gas flows gravitationally downward through the second porous drain tube of the reaction bed to the water recovery loop, wherein the acid adsorbant filter neutralizes the water as the water passes downward through the second drain tube.

8. A condensing heat exchanger device for reducing water content of a flue gas, the device comprising:
a housing of a heat exchanger for passage of the flue gas through the housing;
a housing entrance of the housing wherein the flue gas flows into the housing through the housing entrance;
a housing exit of the housing wherein the flue gas flows from the housing entrance towards the housing exit for passing through the housing;
a heat exchange conduit passing through the housing, wherein the flue gas flows externally of the heat exchange conduit;
a coolant flowing through the heat exchange conduit counter to the flue gas, the flue gas flowing outside of the heat exchange conduit, the coolant flowing inside of the heat exchange conduit, wherein the flue gas flows through the housing across an outer surface of the heat exchange conduit to cool the flue gas;
a base of the housing for collection of water condensed from the flue gas within the heat exchanger, wherein the water collected at the base condenses on the outer surface of the heat exchange conduit;
a reaction bed in the base wherein the water condensed from the flue gas on the outer surface of the heat exchange conduit flows through the reaction bed to remove at least a portion of an acid from the water;
at least one porous drain tube in the reaction bed that allows the water condensed from the flue gas to flow through the base of the housing; and
a make-up water tank wherein the water flows through the drain tube to the make-up water tank, wherein the make-up water tank provides a water supply.

9. The system of claim 8 wherein the porous drain tube further comprises at least one acid adsorbant filter within the drain tube wherein the water flows gravitationally downward through the acid adsorbant filter, wherein the acid adsorbant filter neutralizes the water as the water passes downward through the drain tube.

10. The system of claim 9 wherein the water flows through the acid adsorbant filter when flowing through the drain tube to the make-up water tank and the water recovery loop to remove particulates from the water prior to use of the water.

11. The system of claim 8 further comprising:
an ambient air intake drawing ambient air into the heat exchange conduit to flow within the heat exchange conduit, wherein the coolant is the ambient air drawn into the ambient air intake;
the ambient air flowing through the heat exchange conduit from the housing exit towards the housing entrance counter the flow of the flue gas flowing outside of the heat exchange conduit through the housing, the flue gas flowing across the outer surface of the heat exchange conduit with the ambient air flowing within the heat exchange conduit.

12. The system of claim 11 further comprising:
a stack through which the flue gas exits, wherein the ambient air intake is secured to the stack.

13. The system of claim 12 wherein the ambient air intake is located at least 500 feet above ground level.

14. A condensing heat exchanger system for reducing water content of a flue gas, the system comprising:
a housing of a heat exchanger, wherein the flue gas flows through the heat exchanger;
a housing entrance of the housing wherein the flue gas flows into the housing through the housing entrance;
a housing exit of the housing wherein the flue gas flows longitudinally from the housing entrance towards the housing exit for passing through the housing;
an ambient air intake drawing ambient air into a heat exchange conduit;
the heat exchange conduit passing through the housing, the heat exchange conduit accepts the ambient air from the air intake, the ambient air flowing longitudinally through the heat exchange conduit from the housing exit towards the housing entrance counter the flow of the flue gas through the housing;
wherein the flue gas flows outside of the heat exchange conduit, wherein the ambient air flows within the heat exchange conduit, the flue gas flows through the housing across an outer surface of the heat exchange conduit, wherein the ambient air flows counter to the flue gas through the housing;

a boiler to which the ambient air is directed, wherein the ambient air flows through the heat exchange conduit prior to reaching the boiler, wherein the ambient air flows to the boiler without mixing with a flammable gas prior to reaching the boiler; and a stack, wherein the ambient air intake is positioned on the stack.

15. The system of claim 14 further comprising:

a horizontal conduit that extends horizontally in a direction non-planar to the flow of the flue gas, wherein the horizontal conduit is the heat exchange conduit;

a curved section of the horizontal conduit that directs the horizontal conduit in a direction planar to the flow of the flue gas;

a vertical conduit that extends vertically;

a curved section of the vertical conduit that directs the vertical conduit in a direction planar to the flow of the flue gas;

the ambient air flowing through the vertical conduit and the horizontal conduit from the housing exit towards the housing entrance counter the flow of the flue gas through the housing, wherein the flue gas flows across an outer surface of the horizontal conduit and an outer surface of the vertical conduit, while the ambient air flows inside of the horizontal conduit and the vertical conduit.

16. The system of claim 15 further comprising:

at least one fin extending outward from the curved section of the horizontal conduit; and at least one fin extending outward from the curved section of the vertical conduit.

17. The system of claim 14 further comprising:

a base for collection of water condensed from the flue gas on the outer surface of the heat exchange conduit within the heat exchanger;

a reaction bed located in the base wherein the water from the outer surface of the heat exchange conduit collected at the base flows gravitationally downward through the reaction bed to remove at least a portion of an acid from the water.

18. The system of claim 17 further comprising:

at least one porous drain tube in the reaction bed;

an acid adsorbant filter located within the drain tube, wherein the acid adsorbant filter neutralizes the water as the water passes downward through the drain tube.

19. The system of claim 18 further comprising:

a make-up water tank wherein the water flows through the drain tube and the acid absorbant filter to the make-up water tank, wherein the make-up water tank is connected to the water recovery loop of said power plant for supplying the water within the make-up water tank for use in said power plant.

20. The system of claim 14, wherein the boiler is for a coal-fired power plant.

* * * * *